United States Patent
Vashistha et al.

(10) Patent No.: US 8,379,911 B2
(45) Date of Patent: Feb. 19, 2013

(54) METHOD AND SYSTEM FOR EFFICIENT WATERMARKING OF VIDEO CONTENT

(75) Inventors: Aditya Vashistha, Rajasthan (IN); Rajarathnam Nallusamy, Tamil Nadu (IN); Sanjoy Paul, Karnataka (IN)

(73) Assignee: Infosys Technologies Limited, Bangalore, Karnataka (IN)

( * ) Notice: Subject to any disclaimer, the term of this patent is extended or adjusted under 35 U.S.C. 154(b) by 114 days.

(21) Appl. No.: 13/027,675

(22) Filed: Feb. 15, 2011

(65) Prior Publication Data

US 2012/0148089 A1    Jun. 14, 2012

(30) Foreign Application Priority Data

Dec. 10, 2010  (IN) .......................... 3779/CHE/2010

(51) Int. Cl.
*G06K 9/00* (2006.01)
*H04L 9/32* (2006.01)

(52) U.S. Cl. ....................... 382/100; 713/176

(58) Field of Classification Search .................. 382/100, 382/232, 240; 380/51, 54, 210, 252, 287; 370/522–529; 283/72, 74–81, 85, 93; 358/3.28; 713/176, 179

See application file for complete search history.

(56) References Cited

U.S. PATENT DOCUMENTS

| | | | | |
|---|---|---|---|---|
| 6,226,387 | B1 * | 5/2001 | Tewfik et al. | 382/100 |
| 7,646,881 | B2 * | 1/2010 | Zarrabizadeh | 382/100 |
| 8,023,695 | B2 * | 9/2011 | Rhoads | 382/100 |
| 2005/0105763 | A1 | 5/2005 | Lee et al. | |
| 2005/0180569 | A1 | 8/2005 | Kevenaar et al. | |

FOREIGN PATENT DOCUMENTS

JP    2006157377    6/2006

* cited by examiner

*Primary Examiner* — Abolfazl Tabatabai (74) *Attorney, Agent, or Firm* — Michael Best & Friedrich LLP (57) ABSTRACT

A method for watermarking of video content is provided. An averaged scene image is computed for each scene of video content by performing averaging of frames present in each scene of video content. For each averaged scene image a set of random numbers are generated using a secret key to identify pixels at random locations of the averaged scene image. The secret key is associated with a watermark pattern corresponding to each averaged scene image. The identified pixels in each averaged scene image are mapped to each pixel of corresponding watermark pattern to obtain respective mapped pixels. Using respective mapped pixels, values of verification information are fetched and assigned using predetermined rules. The values of verification information are arranged to obtain first visual cryptographic share of watermark pattern for each averaged scene image.

26 Claims, 8 Drawing Sheets

FIG. 1

Table 1

| Color of ith pixel in W | MSB of Rith Pixel of I | VI values (Vi1, Vi2) |
|---|---|---|
| Black | 1 | (0,1) |
| Black | 0 | (1,0) |
| White | 1 | (1,0) |
| White | 0 | (0,1) |

| S.No. | Random Numbers (Ri) | Verification information (VI) |
|---|---|---|
| 0 | 2 | 0,1 |
| 1 | 325 | 1,0 |
| 2 | 615 | 1,0 |
| 3 | 841 | 0,1 |
| 4 | 925 | 1,0 |
| 5 | 1429 | 0,1 |
| 6 | 1670 | 1,0 |
| 7 | 1945 | 0,1 |
| 8 | 5894 | 0,1 |

Averaged Scene Image (I)

| 0 | 1 | 2 msb=1 | ... | 325 msb=1 | ... | n-1 |
|---|---|---|---|---|---|---|
| n | 614 | 615 msb=0 | ... | 841 msb=1 | ... | 2n-1 |
| 2n | 1428 | 1429 msb=0 | ... | 1670 msb=1 | ... | 3n-1 |
| : | : | : | : | : | : | : |
| m-1 | : | 5894 msb=1 | : | : | : | m*n-1 |

| S.No. | Random Number (Ri) | VI | VI' |
|---|---|---|---|
| 0 | 2 | 0,1 | 1,0 |
| 1 | 325 | 1,0 | 1,0 |
| 2 | 615 | 1,0 | 0,1 |
| 3 | 841 | 0,1 | 1,0 |
| 4 | 925 | 1,0 | 0,1 |
| 5 | 1429 | 0,1 | 0,1 |
| 6 | 1670 | 1,0 | 1,0 |
| 7 | 1945 | 0,1 | 1,0 |
| 8 | 5894 | 0,1 | 1,0 |

| Averaged Scene Image (I) | | | | | | |
|---|---|---|---|---|---|---|
| 0 | 1 | 2 msb=1 | : | 325 msb=1 | : | n-1 |
| n | 614 | 615 msb=0 | : | 841 msb=1 | 925 msb=0 | 2n-1 |
| 2n | 1428 | 1429 msb=0 | : | 1670 msb=1 | 1945 msb=1 | 3n-1 |
| : | : | : | : | : | : | : |
| m-1 | : | 5894 msb=1 | : | : | : | m*n-1 |

Retrieved pattern (W')

FIG. 8

METHOD AND SYSTEM FOR EFFICIENT WATERMARKING OF VIDEO CONTENT

FIELD OF THE INVENTION

The present invention relates generally to the field of watermarking video content and more specifically to a method and system for efficient watermarking of each scene of video content using visual cryptography.

BACKGROUND OF THE INVENTION

Convergence of networks, services and devices has facilitated increase in access to online digital media content by users which in turn has facilitated illegal copying and distribution of digital media. Illegal copying and distribution of original digital media content with or without modifications can take place in numerous ways including, but not limited to, peer-to-peer (P2P) file sharing systems, websites that accept user generated content (UGC) or copies in compact disks (CDs) and digital video disks (DVDs). For example, video signals are highly susceptible to attacks such as frame averaging, frame swapping, frame dropping, statistical analysis and interpolation which results in tampering the original video content and making it available as some other video content. Further, frames in the video signal, like images, are susceptible to various image processing attacks such as joint photographic experts group (JPEG) compression, sharpening, lightening, darkening, noising, blurring, distortion, rescaling, rotation, cropping, jittering and mosaic attacks. In addition, high volume of uploaded media content in social networking and media sharing websites makes it difficult to monitor all the uploaded content for copyright infringement, piracy and illegal distribution.

Digital watermarking is currently adopted for copyright protection of digital media content. Digital watermark is a visible or an invisible watermark pattern inserted into digital media which facilitates identifying copyright owner of the digital media. Conventionally, watermark pattern is embedded into original video content in spatial domain which includes embedding identical or non-identical watermarks in frames of the video content. Watermark pattern may also be embedded into original video content in frequency domain i.e. in discrete wavelet transform (DWT) bands, using techniques of multi-resolution signal decomposing, using discrete fourier transform (DFT), using discrete cosine transform (DCT), and using DCT based perceptual watermarking methods.

However, the above-mentioned watermarking techniques are prone to watermark attacks that are aimed at detecting, distorting and destroying the embedded watermark pattern. Further, the above-mentioned techniques result in drawbacks because of large volume of video data and inherent redundancy between the frames which poses difficulty in identifying transition between the frames. For example, if identical watermark pattern is embedded in the frames, an attacker can get information regarding the video content by colluding with frames from different scenes of the video. Further, if non-identical watermark pattern is used for each frame, then attacker may remove watermark pattern by identifying motionless regions in successive video frames and comparing and averaging the frames statistically.

Embedding watermark in original video content, therefore, makes watermark pattern susceptible to various image and video watermarking attacks and attackers can use embedded information for detecting and destroying or degrading watermark content embedded into videos. Moreover, the video signals are highly susceptible to piracy attacks including frame averaging, frame dropping, frame swapping, statistical analysis, interpolation, time editing, inter video correlation, intra video correlation etc. which degrades or removes the embedded watermark from the video content. In addition, perceptual fidelity is an important aspect of watermarking process. Due to three-dimensional characteristic of video data, maintaining imperceptibility of the watermark content is a considerably difficult task. Further, conventional techniques offer difficulty in detecting watermark pattern accurately or efficiently if there is scene dropping in the original watermark content.

In light of the above, there is a need for a system and method for optimized watermarking of each scene of video content using visual cryptography. There is a need for a system and method for watermarking averaged scene images of video content employing visual secret sharing in an imperceptible way. There is a need for a robust, secure and efficient watermarking technique which is useful for detecting copyright infringement of each scene of a video content.

SUMMARY OF THE INVENTION

A method for watermarking of video content is provided. The video content comprises one or more scenes. In various embodiments of the present invention, the method comprises, firstly, computing an averaged scene image for each scene of video content. The averaged scene image is computed by performing averaging of frames present in each scene of video content. Secondly, the method comprises generating a set of random numbers for each averaged scene image using a secret key to identify pixels at random locations of the averaged scene image. The secret key is associated with a watermark pattern corresponding to each averaged scene image. The method further comprises mapping the identified pixels in each averaged scene image to each pixel of corresponding watermark pattern to obtain respective mapped pixels. Furthermore, the method comprises fetching and assigning values of verification information using the respective mapped pixels based on predetermined rules. Finally, the method comprises arranging the values of verification information to obtain a first visual cryptographic share of watermark pattern for each averaged scene image.

In an embodiment of the present invention, the method further comprises, firstly, identifying location of a frame in the video content at which a new scene starts. The location of the frame at which new scene starts is identified based on color information in the frames. Secondly, the method comprises representing location information of the frame in a scene start point information vector to detect change of scene in the video content. In another embodiment of the present invention, computing an averaged scene image for each scene of video content by performing averaging of frames present in each scene of video content comprises, firstly, detecting each scene using the scene start point information vector. Secondly, the method comprises identifying color components of each pixel of each frame of each scene. Finally, the method comprises computing an average color component value of the identified color components to perform averaging of frames. The average color component values represent the averaged scene image.

In an embodiment of the present invention, the set of random numbers generated is equal to the number of pixels in the watermark pattern. In another embodiment of the present invention, mapping the identified pixels in each averaged scene image to each pixel of corresponding watermark pattern to obtain respective mapped pixels comprises, firstly, obtaining most significant bit of the identified pixels in each averaged scene image and mapping the most significant bit of the identified pixels in each averaged scene image to color of each pixel of corresponding watermark pattern. In another embodiment of the present invention, the values of verification information and predetermined rules are based on (k,n) visual secret sharing. In an embodiment of the present invention, the first cryptographic share of watermark pattern for each averaged scene image and the secret key are stored.

In an embodiment of the present invention, the method further comprises computing color histogram information of each averaged scene image and storing the computed color histogram information.

In another embodiment of the present invention, the method further comprises, firstly, performing digital signing and timestamping of first visual cryptographic share of watermark pattern for each averaged scene image. Secondly, the method comprises encrypting the time stamped and digitally signed first visual cryptographic share of watermark pattern for each averaged scene image. Finally, the method comprises mapping each of the encrypted first visual cryptographic share of watermark pattern with color histogram information of corresponding averaged scene image and storing the mapped information.

A method for verifying watermark pattern of a video content to confirm copyright ownership of a watermark protected video content is provided. In various embodiments of the present invention, the method comprises, firstly, receiving at least a set of first visual cryptographic share of watermark pattern of the watermark protected video content and a secret key. Secondly, the method comprises computing an averaged scene image for each scene of the video content. The averaged scene image is computed by performing averaging of frames present in each scene of the video content. Further, the method comprises generating a set of random numbers for each averaged scene image using the secret key to identify pixels at random locations of each averaged scene image. The method further comprises fetching and assigning values of verification information using the identified pixels based on predetermined rules. Furthermore, the method comprises arranging the values of verification information to obtain a second visual cryptographic share of each averaged scene image. Further, the method comprises retrieving the watermark pattern corresponding to each averaged scene image of the video content by overlapping the second visual cryptographic share corresponding to each averaged scene image on corresponding first visual cryptographic share of watermark pattern of the watermark protected video content. The first visual cryptographic share of watermark pattern is selected for each averaged scene image from the set of first visual cryptographic share of watermark pattern. Finally, the method comprises verifying the retrieved watermark pattern of each averaged scene image to ascertain if the retrieved watermark is same as the original watermark pattern.

In an embodiment of the present invention, the method further comprises, firstly, identifying location of a frame in the video content at which a new scene starts. The location of the frame at which new scene starts is identified based on color information in the frames. Secondly, the method comprises representing location information of the frame in a scene start point information vector to detect change of scene in the video content.

In an embodiment of the present invention, fetching and assigning values of verification information using the identified pixels based on predetermined rules comprises, firstly, obtaining most significant bit values of the identified pixels. Secondly, the method comprises fetching and assigning values of verification information using most significant bit values obtained from the identified pixels based on predetermined rules. The values of verification information and predetermined rules are based on (k,n) visual secret sharing.

In an embodiment of the present invention, the method further comprises computing color histogram information of each averaged scene image. In another embodiment of the present invention, retrieving the watermark pattern corresponding to each averaged scene image of the video content by overlapping the second visual cryptographic share on corresponding first visual cryptographic share of watermark pattern comprises, firstly, receiving a set of color histogram information associated with first visual cryptographic share of watermark pattern for each averaged scene image of the watermark protected video content. Secondly, the method comprises comparing the color histogram information of each averaged scene image of the video content with color histogram information associated with first visual cryptographic share of watermark pattern for each averaged scene image of the watermark protected video content. The method further comprises identifying a best matched color histogram based on the color histogram comparison and selecting a first visual cryptographic share of watermark pattern associated with a color histogram information that corresponds to the best matched color histogram. Finally, the method comprises decrypting the selected first visual cryptographic share of watermark pattern to overlap the first visual cryptographic share of watermark pattern on the second visual cryptographic share.

In an embodiment of the present invention, the method further comprises performing verification of digital signature of the first visual cryptographic share of watermark pattern for each averaged scene image of the watermark protected video content.

A system for watermarking of video content is provided. The video content comprises one or more scenes. In various embodiments of the present invention, the system comprises a scene averaging module configured to compute averaged scene image of each scene of the video content. The system further comprises a watermarking module configured to receive each averaged scene image and generate a set of random numbers for each averaged scene image using a secret key to identify pixels at random locations of the averaged scene image. The secret key is associated with a watermark pattern corresponding to each averaged scene image. The watermarking module is further configured to generate verification information for each averaged scene image by mapping the identified pixels of the averaged scene image to each pixel of corresponding watermark pattern. The verification information represents a first visual cryptographic share of watermark pattern for each averaged scene image.

In an embodiment of the present invention, the system further comprises a scene detection module configured to detect change of scene in the video content by identifying location of a frame in the video content at which a new scene starts.

In an embodiment of the present invention, the watermarking module is configured to fetch and assign values of verification information using the mapped pixels based on predetermined rules. The values of verification information and predetermined rules are based on (k,n) visual secret sharing. The watermarking module is further configured to arrange the values of verification information to obtain the first visual cryptographic share of watermark pattern.

In another embodiment of the present invention, the watermarking module is configured to perform digital signing and timestamping of first visual cryptographic share for each averaged scene image of the watermark protected video content. The watermarking module is further configured to encrypt the time stamped and digitally signed first visual cryptographic share of watermark pattern for each averaged scene image. Furthermore, the watermarking module is configured to map each of the encrypted first visual cryptographic share of watermark pattern with computed color histogram information of corresponding averaged scene image and store the mapped information.

A system for verifying watermark pattern of a video content to confirm copyright ownership of the watermark protected video content is provided. In various embodiments of the present invention, the system comprises a scene averaging module configured to compute averaged scene image of each scene of the video content. The system further comprises a watermark verification module configured to receive at least a set of first visual cryptographic share of watermark pattern of the watermark protected video content and a secret key. The watermark verification module is further configured to receive each averaged scene image computed in the scene averaging module and generate a set of random numbers for each averaged scene image using the secret key to identify pixels at random locations of the averaged scene image. The watermark verification module is further configured to generate a verification information for each averaged scene image using the identified pixels. The verification information represents a second visual cryptographic share of each averaged scene image. Further, the watermark verification module is configured to select a first visual cryptographic share of watermark pattern of the watermark protected video content from the received set of first visual cryptographic share of watermark pattern. Furthermore, the watermark verification module is configured to retrieve the watermark pattern for each averaged scene image of the video content by overlapping the selected first visual cryptographic share of watermark pattern on the second visual cryptographic share corresponding to each averaged scene image to verify if the retrieved watermark pattern is same as the original watermark pattern.

In an embodiment of the present invention, the system further comprises a scene change detection module configured to identify the frames at which a new scene starts on the basis of color information contained in the scene.

In another embodiment of the present invention, the watermark verification module is configured to fetch and assign values of verification information using the identified pixels on the basis of predetermined rules. The values of verification information and predetermined rules are based on (k,n) visual secret sharing. Further, the watermark verification module is configured to arrange the values of verification information to obtain the second visual cryptographic share of the averaged scene image.

In an embodiment of the present invention, the watermark verification module is further configured to receive a set of color histogram information associated with first visual cryptographic share of watermark pattern for each averaged scene image of the watermark protected video content. Further, the watermark verification module is configured to compute color histogram information of each averaged scene image of the video content and compare color histogram information of each averaged scene image of the video content with color histogram information associated with first visual cryptographic share of watermark pattern for each averaged scene image of watermark protected video content. The watermark verification module is further configured to identify a best matched color histogram based on the color histogram comparison and select a first visual cryptographic share of watermark pattern of the watermark protected video content that correspond to the best matched color histogram for each averaged scene image from the received set of first visual cryptographic share of watermark pattern.

In an embodiment of the present invention, the watermark verification module is further configured to perform verification of digital signature of the first visual cryptographic share of watermark pattern for each averaged scene image of the watermark protected video content and decrypt the selected first visual cryptographic share of watermark pattern to overlap the first visual cryptographic share of watermark pattern on the second visual cryptographic share.

A computer program product for watermarking of video content is provided. The video content comprises one or more scenes. In various embodiments of the present invention, the computer program product comprises program instruction means for computing an averaged scene image for each scene of video content. The averaged scene image is computed by performing averaging of frames present in each scene of video content. The computer program product further comprises program instruction means for generating a set of random numbers for each averaged scene image using a secret key to identify pixels at random locations of the averaged scene image. The secret key is associated with a watermark pattern corresponding to each averaged scene image. Further, the computer program product comprises program instruction means for mapping the identified pixels in each averaged scene image to each pixel of corresponding watermark pattern to obtain respective mapped pixels. Furthermore, the computer program product comprises program instruction means for fetching and assigning values of verification information using the respective mapped pixels based on predetermined rules and program instruction means for arranging the values of verification information to obtain a first visual cryptographic share of watermark pattern for each averaged scene image.

A computer program product for verifying watermark pattern of a video content to confirm copyright ownership of a watermark protected video content is provided. In various embodiments of the present invention, the computer program product comprises program instruction means for receiving at least a set of first visual cryptographic share of watermark pattern of the watermark protected video content and a secret key. The computer program product further comprises program instruction means for computing an averaged scene image for each scene of the video content. The averaged scene image is computed by performing averaging of frames present in each scene of the video content. Further, the computer program product comprises program instruction means for generating a set of random numbers for each averaged scene image using the secret key to identify pixels at random locations of each averaged scene image. The computer program product further comprises program instruction means for fetching and assigning values of verification information using the identified pixels based on predetermined rules. Further, the computer program product comprises program instruction means for arranging the values of verification information to obtain a second visual cryptographic share of each averaged scene image. Furthermore, the computer program product comprises program instruction means for retrieving the watermark pattern corresponding to each averaged scene image of the video content by overlapping the second visual cryptographic share corresponding to each averaged scene image on corresponding first visual cryptographic share of watermark pattern of the watermark protected video content. The first visual cryptographic share of watermark pattern is selected for each averaged scene image from the set of first visual cryptographic share of watermark pattern. The computer program product comprises program instruction means for verifying the retrieved watermark pattern of each averaged scene image to ascertain if the retrieved watermark is same as the original watermark pattern.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

A system and method for optimized watermarking of video content is provided. The invention provides a method for watermarking averaged scene images for each scene of video content without modifying the video content. The invention further provides for watermarking the averaged scene image of video content without embedding the watermark pattern in the video content. The watermark pattern is not embedded in frequency or in spatial domain. The invention provides for a system and method that uses visual cryptographic technique for computing visual cryptographic shares using averaged scene images of a video. The invention further provides for a system and method for watermarking video content by extracting data from the video content using visual cryptographic technique, generating and storing a secret share of a watermark pattern. Further, the invention provides for retrieving a watermark pattern to verify the copyright ownership of the watermark protected video or any copyright infringement thereof.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purpose of clarity, details relating to technical material that is known in the technical fields related to the invention have been briefly described or omitted so as not to unnecessarily obscure the present invention.

The present invention would now be discussed in context of embodiments as illustrated in the accompanying drawings.

Figure 1:
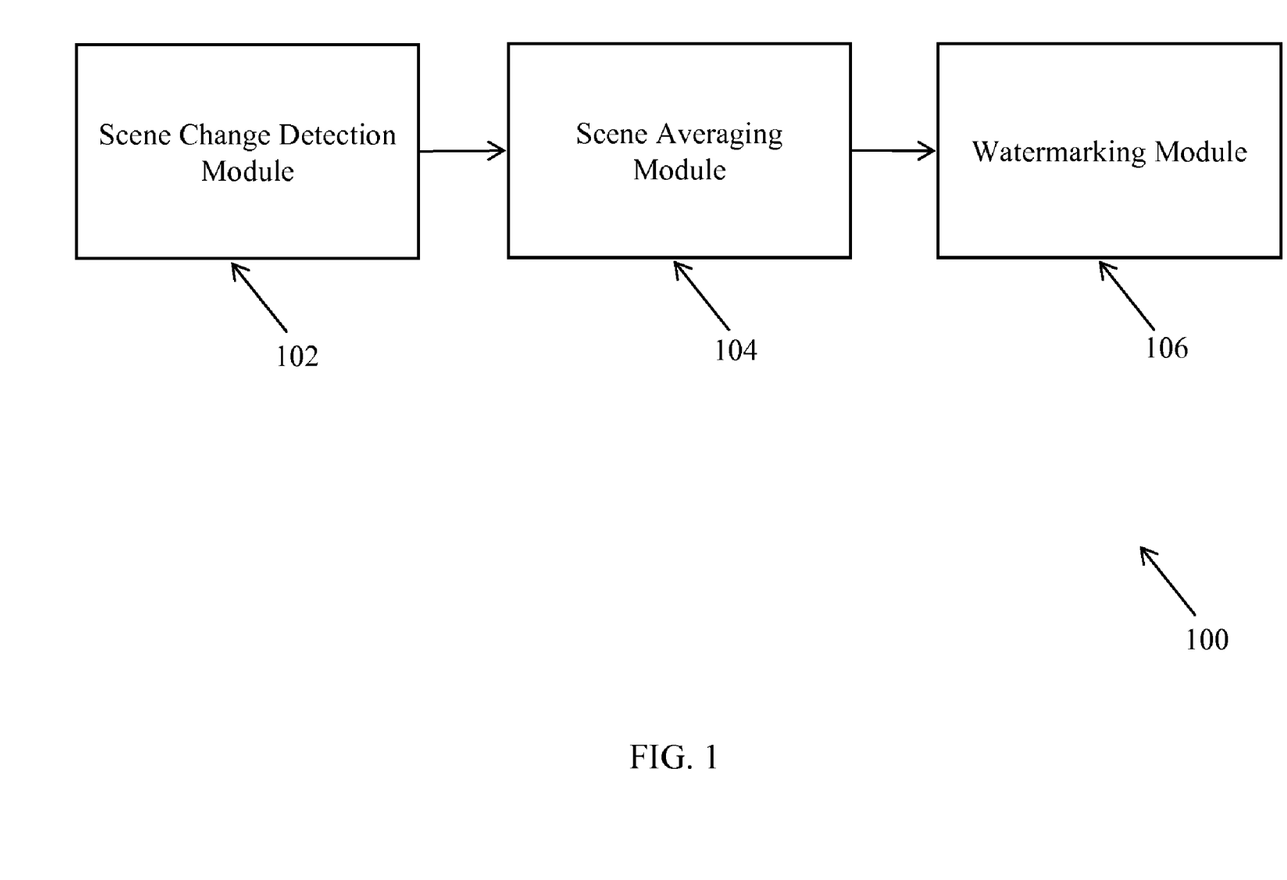
FIG. 1 illustrates a block diagram of a system for efficient watermarking of video content, in accordance with an embodiment of the present invention.

FIG. 1 is a block diagram of a system 100 for efficient watermarking of video content, in accordance with an embodiment of the present invention. In various embodiments of the present invention, the video content may include, but is not limited to, colored video content, monochromatic video content and grey level video content. The system 100 comprises a scene change detection module 102, a scene averaging module 104, and a watermarking module 106.

Scene change detection module 102 is a software module that provides information related to change of scene in a video. In various embodiments of the present invention, change of scene is detected by identifying transitions from one scene to another scene in a video content. Video content comprises multiple scenes and the scenes in turn comprise multiple frames. The transitions may be identified based on measurement of changes across frames. The changes in the frames can be computed from information contained in the frames. The scene change detection module 102 detects the scene changes in the video using known techniques and generates a scene start point information vector. The scene start point information vector represents location of the frame at which a new scene starts.

Scene averaging module 104 is a software module that facilitates to calculate averaged scene image of each scene in the video. In an embodiment of the present invention, using the scene start point information vector, individual scenes in the video are identified. Each scene is converted into averaged scene image by averaging the frames. In an embodiment of the present invention, in case of colored video content, the frames are averaged by averaging color components of all the pixels in all the frames of the individual scenes.

Watermarking module 106 is a software module that facilitates watermarking each averaged scene image of the video using visual cryptographic techniques. In an embodiment of the present invention, visual cryptographic technique includes calculating visual cryptographic shares using (k,n) visual secret sharing scheme. In a (k,n) visual secret sharing scheme, an image is split into 'n' shares such that any k or more image shares can be used to reconstruct the image, any k−1 or less image shares do not reveal any information about the image. In various embodiments of the present invention, a watermark pattern (W) which may be a black and white image is determined by owner of the video content. The watermarking module 106 facilitates watermarking each averaged scene image by computing visual cryptographic share (i.e. first visual cryptographic share) of a watermark pattern using (2,2) visual secret sharing scheme. The visual cryptographic share of the watermark pattern is also referred as verification information (VI). In an embodiment of the present invention, to compute verification information, a random number is selected which is used as a secret key or seed to generate a set of random numbers for the averaged scene image which represent pixels at random locations of the averaged scene image. The number of random numbers generated in the set equals to the number of pixels in the watermark pattern. In an embodiment of the present invention, the same secret key or seed may be used for each scene. In another embodiment of the present invention, different secret keys or seeds may be used for different scenes.

Figure 2:
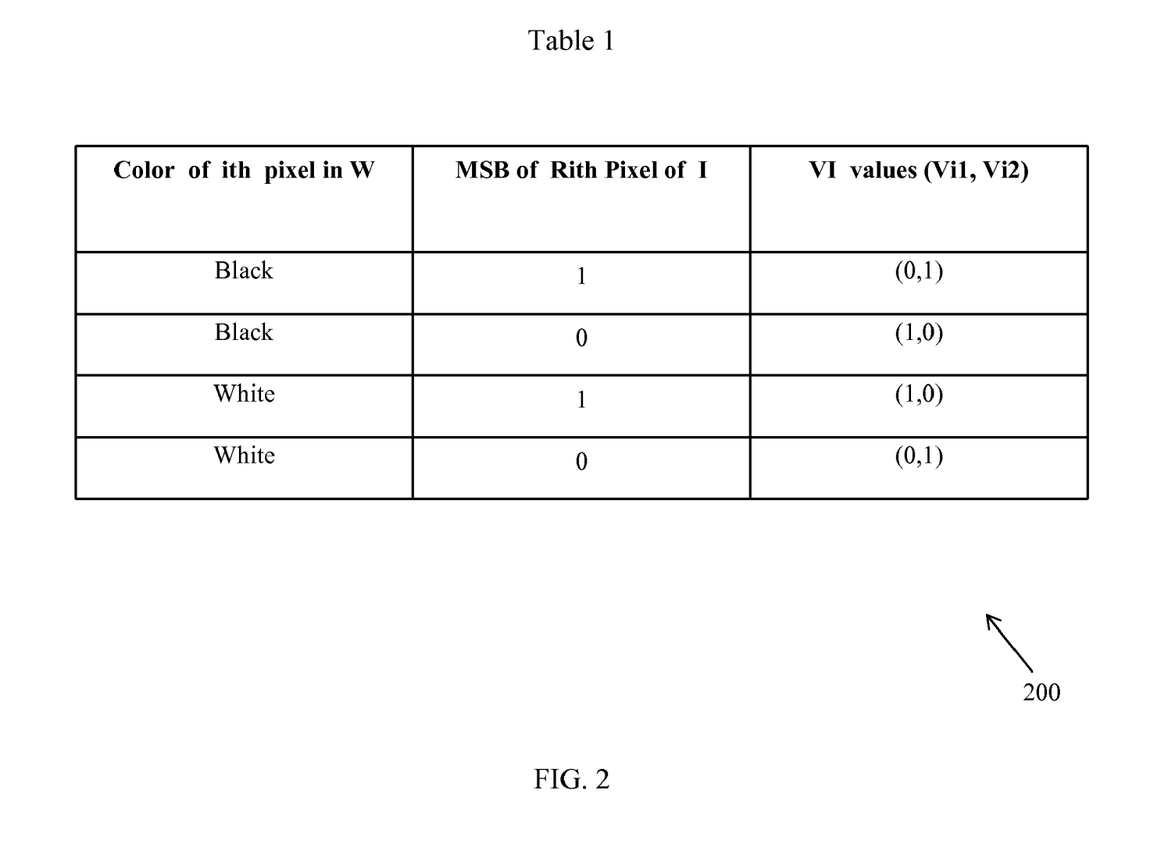
FIG. 2 illustrates a table which depicts rules for assigning values for verification information using (2,2) visual secret sharing, in accordance with an embodiment of the present invention.

The most significant bit (MSB) of pixels in the averaged scene image that correspond to each random number is obtained. Verification information for the averaged scene image is generated by assigning values for verification information using (2,2) visual secret sharing rules provided in Table 1 as shown in FIG. 2. The rules define verification information values which are to be assigned based on the MSB values and color of the pixels of the watermark pattern.

In various embodiments of the present invention, the verification information is encrypted employing digital signature and time stamping. In an embodiment of the present invention, digitally signed and time stamped verification information is stored in a storage media in the watermarking module 106. In another embodiment of the present invention, the verification information can be stored or submitted to a verification authority after encryption. The verification information is the first visual cryptographic share of the watermark pattern.

Figure 3:
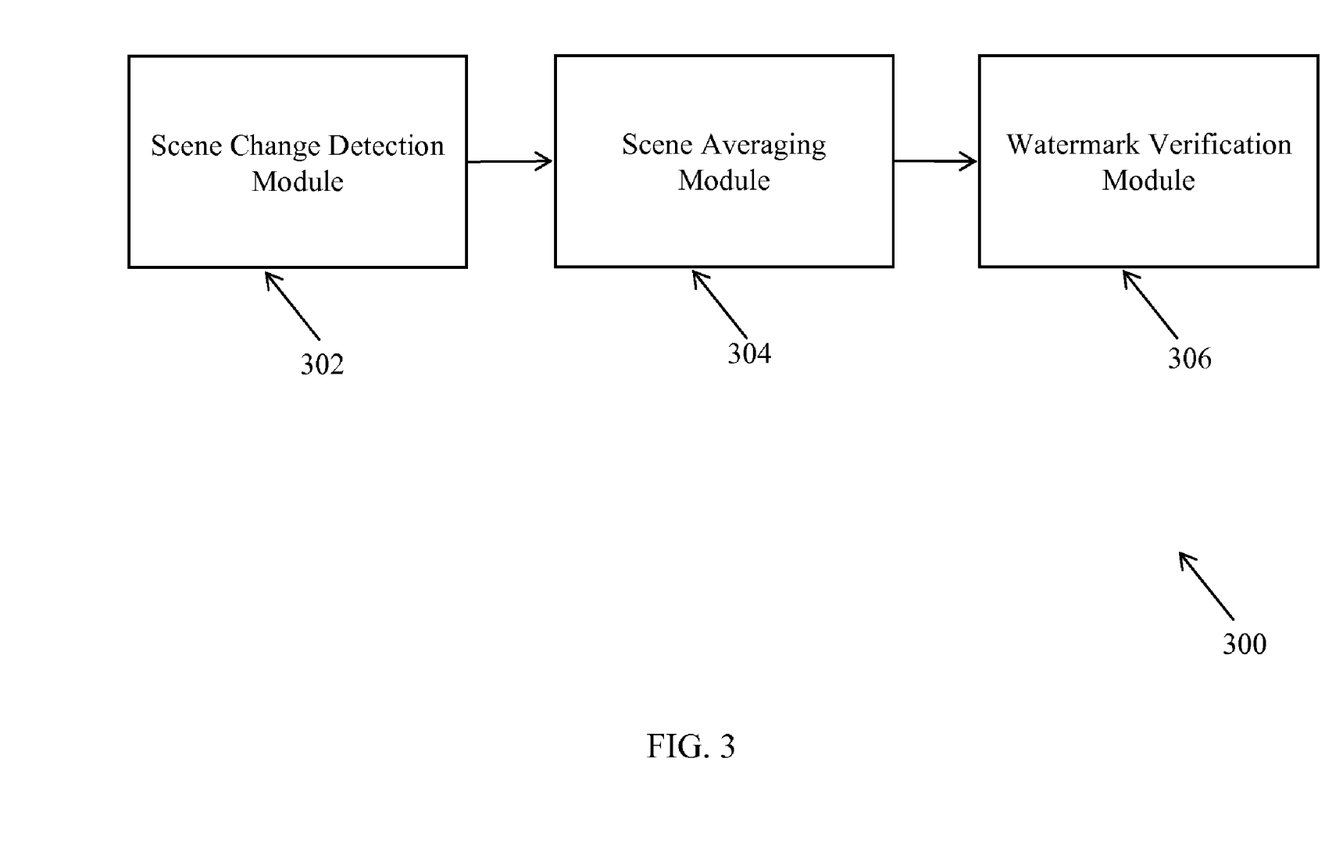
FIG. 3 illustrates a block diagram of a system for verifying watermark pattern of a video content to confirm copyright ownership of a watermark protected video, in accordance with an embodiment of the present invention.

FIG. 3 is a block diagram of a system 300 for verifying watermark pattern of a video content to establish copyright ownership of a watermark protected video, in accordance with an embodiment of the present invention. In an embodiment of the present invention, the video content may be suspected of being an illegal copy of entire or part of the original video (i.e. watermark protected video content). In another embodiment of the present invention, the video content may include, but is not limited to, colored video content, monochromatic video content and grey level video content. The system 300 comprises a scene change detection module 302, a scene averaging module 304, and watermark verification module 306.

The scene change detection module 302 and the scene averaging module 304 operate in the manner as described with respect to FIG. 1.

Watermark verification module 306 is a software module which facilitates retrieving the watermark pattern from the video content. In an embodiment of the present invention, the video content may be suspected of being an illegal copy of a part or the entire original watermark protected video. The watermark pattern is retrieved to verify the suspected video for copyright infringement of the watermark protected video content. In various embodiments of the present invention, the watermark verification module 306 facilitates verifying watermark pattern using the secret key and the first visual cryptographic share of the watermark pattern. In an embodiment of the present invention, visual cryptographic share (i.e. second visual cryptographic share) of averaged scene image of the video content is obtained using the secret key. The second visual cryptographic share of the averaged scene image is referred as the verification information (VI'). The secret key is used to identify pixels at random locations of the averaged scene image. Most significant bit (MSB) of pixels at random locations of the averaged scene image is obtained. Based on the MSB of pixels at random location, values for verification information (VI') are assigned using rules to assign VI' based on (2,2) visual secret sharing scheme. The watermark verification module 306, then, overlaps the first visual cryptographic share of a scene corresponding to original video (i.e. watermark protected video content) and the second visual cryptographic share of a scene from the suspected video to retrieve the watermark pattern. The retrieved watermark pattern will be same as the original watermark pattern only if the averaged scene images and the secret key used in verification process are same as those used in the watermarking process.

Figure 4:
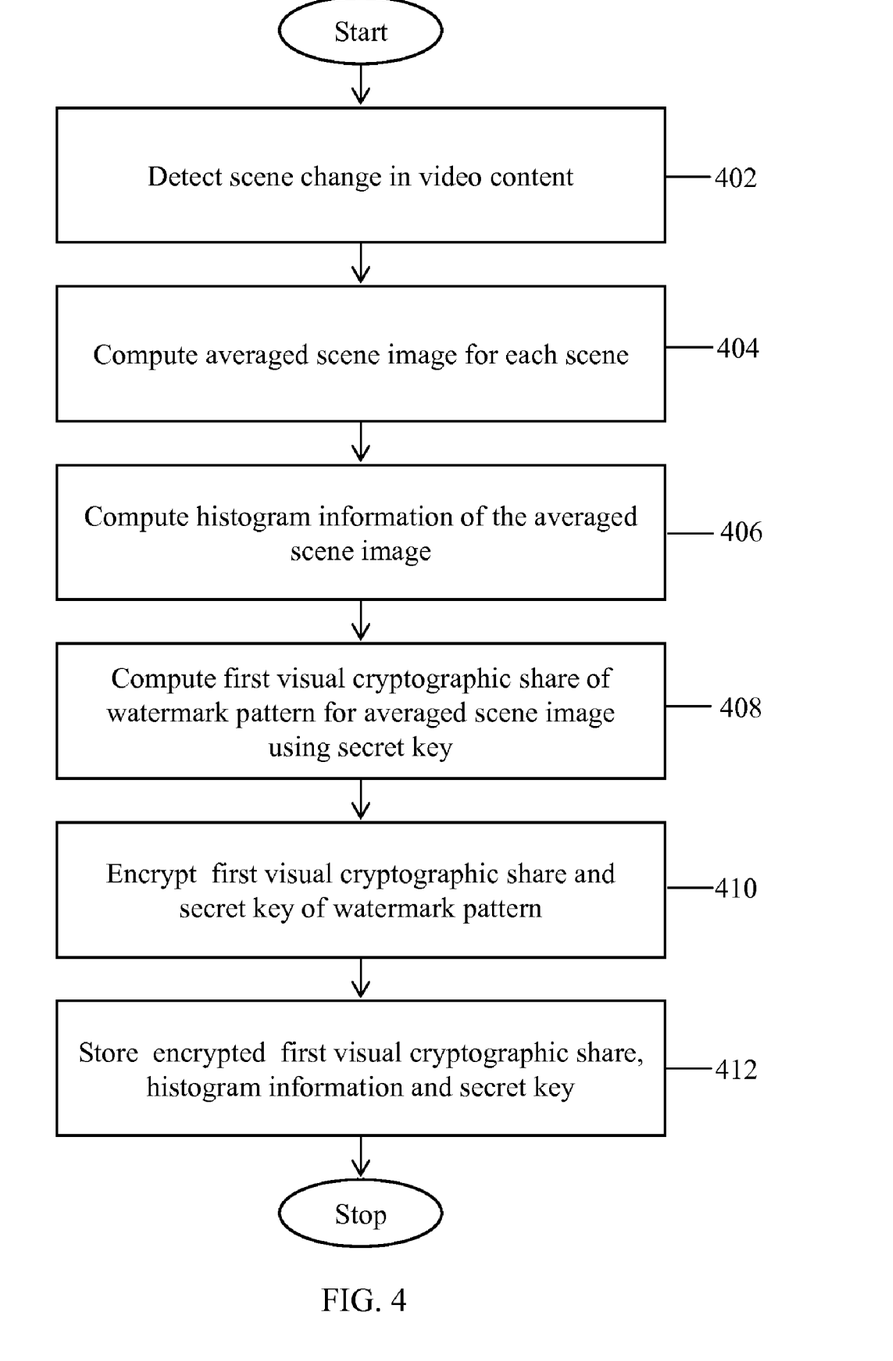
FIG. 4 illustrates a flowchart of a method for efficient watermarking of video content, in accordance with an embodiment of the present invention.

FIG. 4 illustrates a flowchart of a method for efficient watermarking of video content, in accordance with an embodiment of the present invention.

At step 402, scene changes in the video content are detected. In an embodiment of the present invention, change of scene in the video content may be detected by identifying and measuring changes across frames in the scenes. In an embodiment of the present invention, in case of colored video content, the changes across frames may be identified and measured by employing color histogram techniques that uses information of colors in the frames.

In an embodiment of the present invention, color histogram technique may include obtaining a frame difference vector for consecutive frames of a video using $\chi^2$ comparison of color histograms. Each frame may be divided into four (2*2) blocks by using a step size of half-the-width and half-the-height of frame. The frame difference vector may be calculated as a sum of difference between corresponding blocks in the divided 4(2*2) blocks of each frame. The frame difference vector may be used to extract scene change information. The scene change information detected for each scene may be represented in a scene start point information vector. Each entry in the scene start point information vector represents location of the frame at which a new scene starts. In another embodiment of the present invention, weight for brightness grade change of each color space (e.g. RGB—Red, Green, Blue) may be used to calculate the frame difference vector to make the scene change detection more robust. In yet another embodiment of the present invention, scaled frame difference technique may be used to obtain the frame difference vector to make scene change detection more robust.

At step 404, averaged scene image for each scene of video content is computed. In various embodiments of the present invention, using the scene start point information vector, average scene image corresponding to each scene is computed. In an embodiment of the present invention, the average frame is computed by calculating an average color component value for color components in each pixel of all the frames in a scene. In an exemplary embodiment of the present invention, if color space of the scene is RGB, an average color component value for red, green and blue components for each pixel in all the frames of the scene are computed. The average color component value represents the averaged scene image. For example, it is identified that scene change detection occurs at frame 9 and at frame 210 of video content. Therefore, frames which constitute one scene are frames 9 to 209. The average color component values for red, green and blue components for each pixel in all the frames from frame 9 to frame 209 are calculated.

At step 406, histogram information (Hi1) of each averaged scene image is computed. In an embodiment of the present invention, in case of colored video content, color histogram information may be computed. Color histogram information represents color distribution information of each averaged scene image. In an exemplary embodiment of the present invention, the color histogram information is computed using two most significant bits of each color channel for a total of n=64 bins in the histogram. In another embodiment of the present invention, in case of monochromatic or grey level video content, histogram information (Hi1) may be computed. In yet another embodiment of the present invention, characterizing information pertaining to video content may be computed from colored, monochromatic or grey level video content which may be used for performing image matching during verification of a suspected video content.

At step 408, a first visual cryptographic share of watermark pattern is computed for each averaged scene image using a secret key. In various embodiments of the present invention, owner of the image may select a black and white image as the watermark pattern. In an embodiment of the present invention, (2,2) visual secret sharing scheme may be used for computing a first visual cryptographic share of a watermark pattern. The first visual cryptographic share of the watermark pattern may be referred as verification information.

In an embodiment of the present invention, for computing the first visual cryptographic share of the watermark pattern, a random number is selected which is used as a secret key or seed to generate a set of random numbers for the averaged scene image. The number of random numbers generated in the set equals the number of pixels in the watermark pattern. In an embodiment of the present invention, the random numbers may be numbers lying between 0 and the number of pixels in the averaged scene image, which represent pixels at random locations of the averaged scene image. In an exemplary embodiment of the present invention, if size of the watermark pattern (W) is h*l and size of the averaged scene image (I) is m*n, using S as seed, h*l random numbers are generated over the (0, m*n) interval of the averaged scene image (I). The random numbers may be denoted as Ri. The value of MSB of a pixel on the averaged scene image (I) at the location corresponding to each random number is obtained. The MSB values are then mapped to a corresponding pixel in the watermark pattern and values for verification information (i.e. (Vi1, Vi2), where i represents ith pair of VI) are assigned using rules to assign values for verification information (VI) based on (2,2) visual secret sharing as depicted in Table 1 shown in FIG. 2. The VI for the watermark pattern corresponding to an averaged scene image is computed by assembling all the (Vi1, Vi2) pairs.

Figure 5:
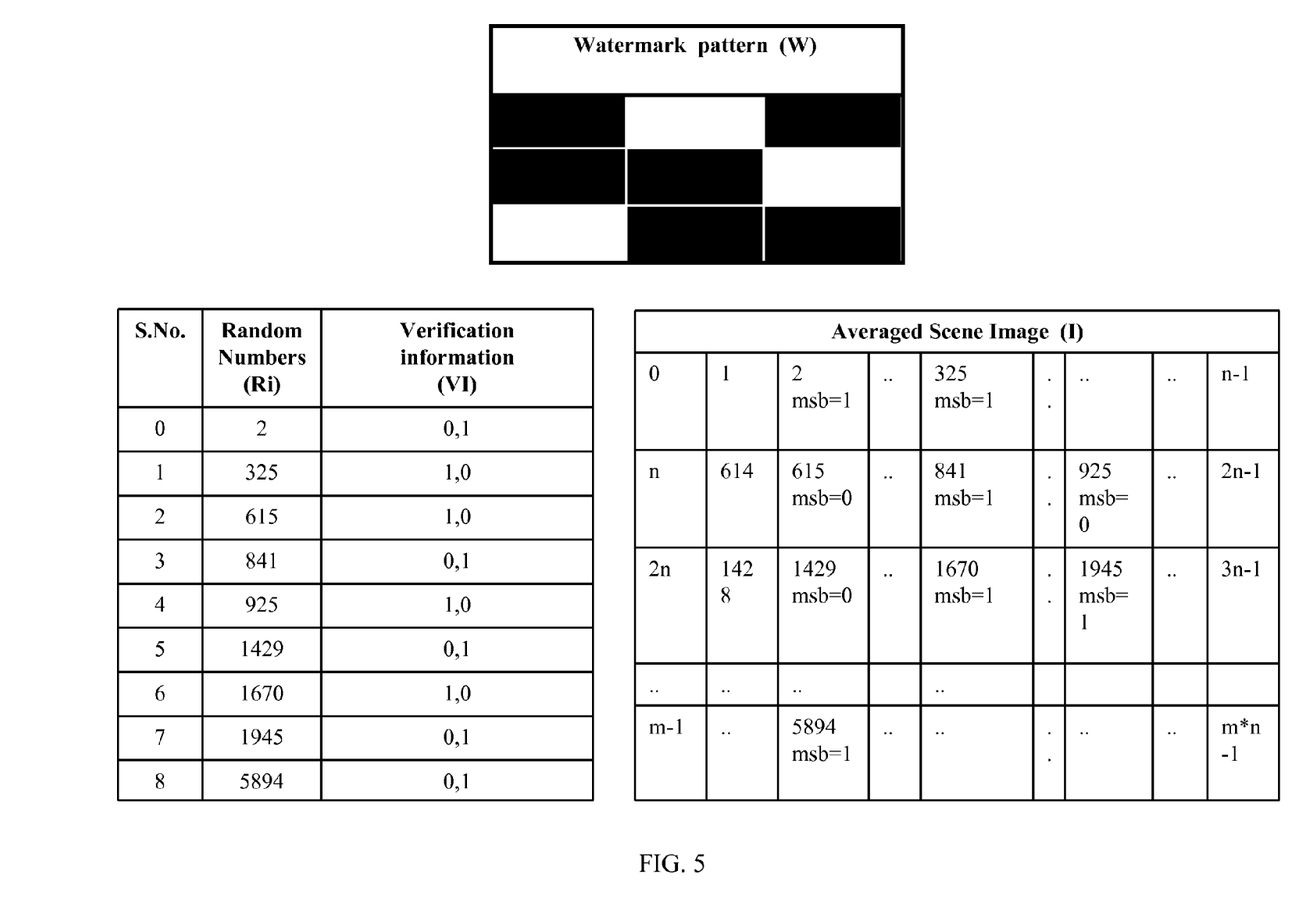
FIG. 5 illustrates tables that represent mapping of watermark pattern to averaged scene image using secret key, in accordance with an embodiment of the present invention.

In an exemplary embodiment of the present invention, referring to FIG. 5, the watermark pattern is BWBBBWWBB (represented as serial no. 0, 1, 2, 3, 4, 5, 6, 7, 8) and the random numbers Ri generated are 2, 325, 615, 841, 925, 1429, 1670, 1945, 5894. As shown in FIG. 5, the value of the MSB of a pixel on the averaged scene image at the location corresponding to the random number 2 is 1. Referring to Table 1, the VI value assigned is (0, 1) if color of the ith pixel of the watermark pattern is black and the MSB of Rith pixel of averaged scene image is 1. Similarly, the VI value assigned is (1, 0) if color of the ith pixel of the watermark pattern is black and the MSB of Rith pixel of averaged scene image is 0. The VI for the watermark pattern BWBBBWWBB is therefore (0,1), (1,0), (1,0), (0,1), (1,0), (0,1), (1,0), (0,1) and (0, 1) which is the first visual cryptographic share of the watermark pattern. Each 1 bit pixel of the watermark pattern is, therefore, encoded into two shared shadow images i.e. either (0,1) or (1, 0). The VI obtained is the first visual cryptographic share of (2,2) visual secret sharing scheme of the watermark pattern corresponding to the averaged scene image of the video to be protected.

In an embodiment of the present invention, the first visual cryptographic share of watermark pattern and the secret key is stored. In another embodiment of the present invention, the first visual cryptographic share of watermark pattern and the secret key is maintained for submitting to a relevant unit for verification of the watermark. In an embodiment of the present invention, the first visual cryptographic share for watermark pattern is computed for each scene in the video which is to be protected.

At step 410, the first visual cryptographic share of the watermark pattern and secret key are encrypted. In various embodiments of the present invention, the first visual cryptographic share of the watermark pattern and the secret key are digitally signed and time-stamped for secure use at the time of verification of the watermark pattern. The digitally signed and time stamped video content are then encrypted using known encryption technologies.

At step 412, the first visual cryptographic share, histogram information and secret key are stored. In an embodiment of the present invention, each encrypted first visual cryptographic share of watermark pattern corresponding to an averaged scene image in the video content is stored by mapping the encrypted first visual cryptographic share of watermark pattern to histogram (Hi1) information corresponding to scene's averaged image. In another embodiment of the present invention, each encrypted first visual cryptographic share of watermark pattern corresponding to an averaged scene image in the video content is stored by mapping the first visual cryptographic share of watermark pattern to color histogram (Hi1) information corresponding to scene's averaged image.

In an embodiment of the present invention, the second visual cryptographic share is computed during verification of the watermark image on a video content. The video content may be suspected of being an illegal copy of entire or part of the original video (i.e. watermark protected video content).

In an embodiment of the present invention, the original watermark pattern, the secret key, digital certificate, the histogram information (Hi1) vectors and the verification information for each averaged scene image are submitted by the owner of the original video to a verification authority for verification of the watermark pattern. In an embodiment of the present invention, the verification authority may include a notary organization. The verification is performed to establish copyright infringement by the suspected video or scenes contained in it. If the owner of the original video suspects that another video is a copy of the original video or includes scenes from the original video, the verification of watermark may be performed using the method described in FIG. 6. Prior to the verification process, the digital signature and time stamp of each verification information for each averaged scene image of the protected video are decrypted and verified using public key which is contained in the digital certificate that is submitted to the verification authority.

Figure 6:
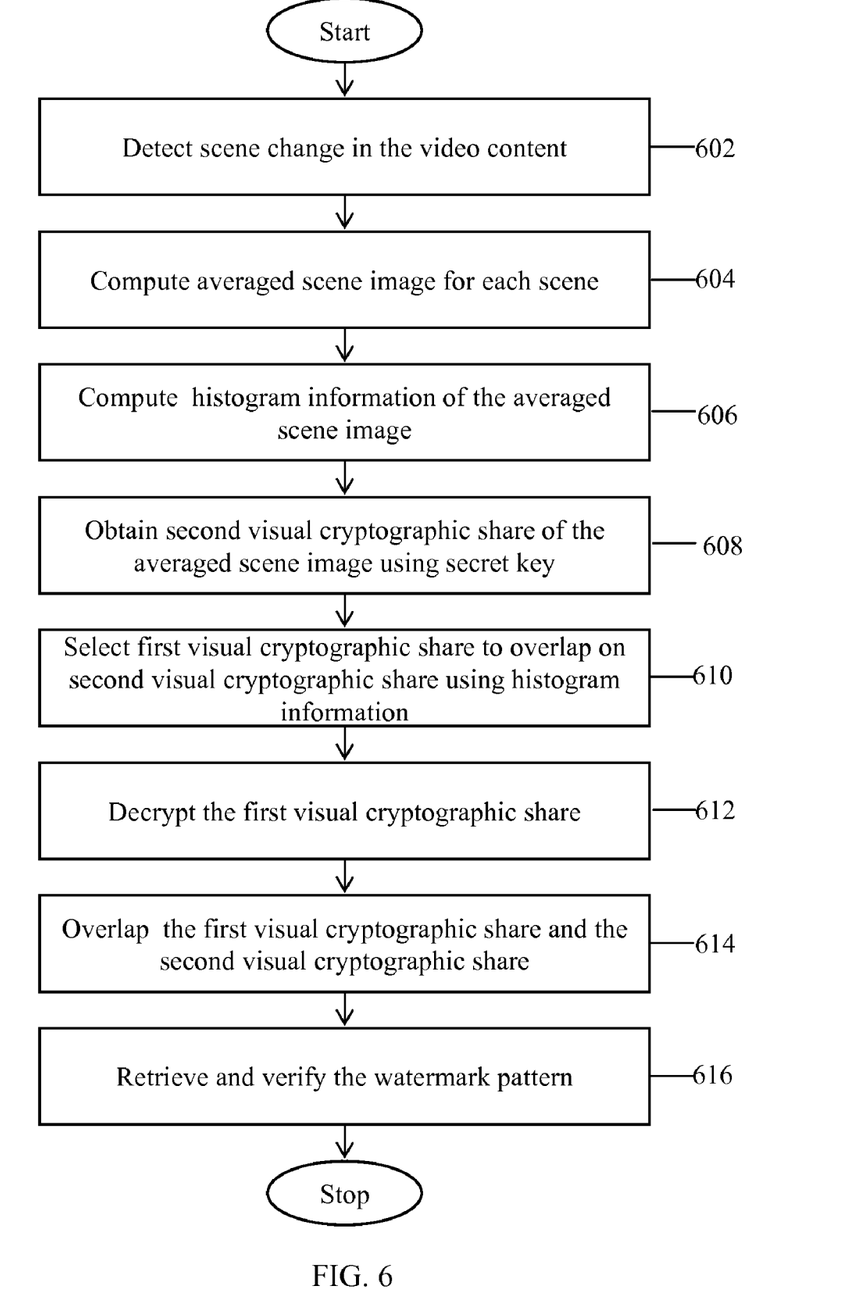
FIG. 6 illustrates a flowchart of a method for verifying watermark pattern of a video content to confirm copyright ownership of the watermark protected video, in accordance with an embodiment of the present invention.

FIG. 6 illustrates a flowchart of a method for verifying watermark pattern of a video content to confirm copyright ownership of the watermark protected video, in accordance with an embodiment of the present invention.

At step 602, scene change of a video content is detected. In various embodiments of the present invention, scene start point information vector is computed based on scene changes detected in the video content as mentioned with respect to FIG. 4.

At step 604, averaged scene image for each scene of the video content is computed. In various embodiments of the present invention, the video content is suspected of being an illegal copy of entire or part of the original video (i.e. watermark protected video). As mentioned with respect to FIG. 4, scene start point information vector is used to obtain boundaries of scene and then averaging is performed on the pixels for all the frames within the boundary to obtain the averaged scene image.

At step 606, histogram information (Hi2) of each averaged scene image is computed. In an embodiment of the present invention, in case of colored video content, the color histogram information is computed which represents color distribution information of each averaged scene image. In an exemplary embodiment of the present invention, the color histogram information is computed using two most significant bits of each color channel for a total of n=64 bins in the histogram.

Figure 8:
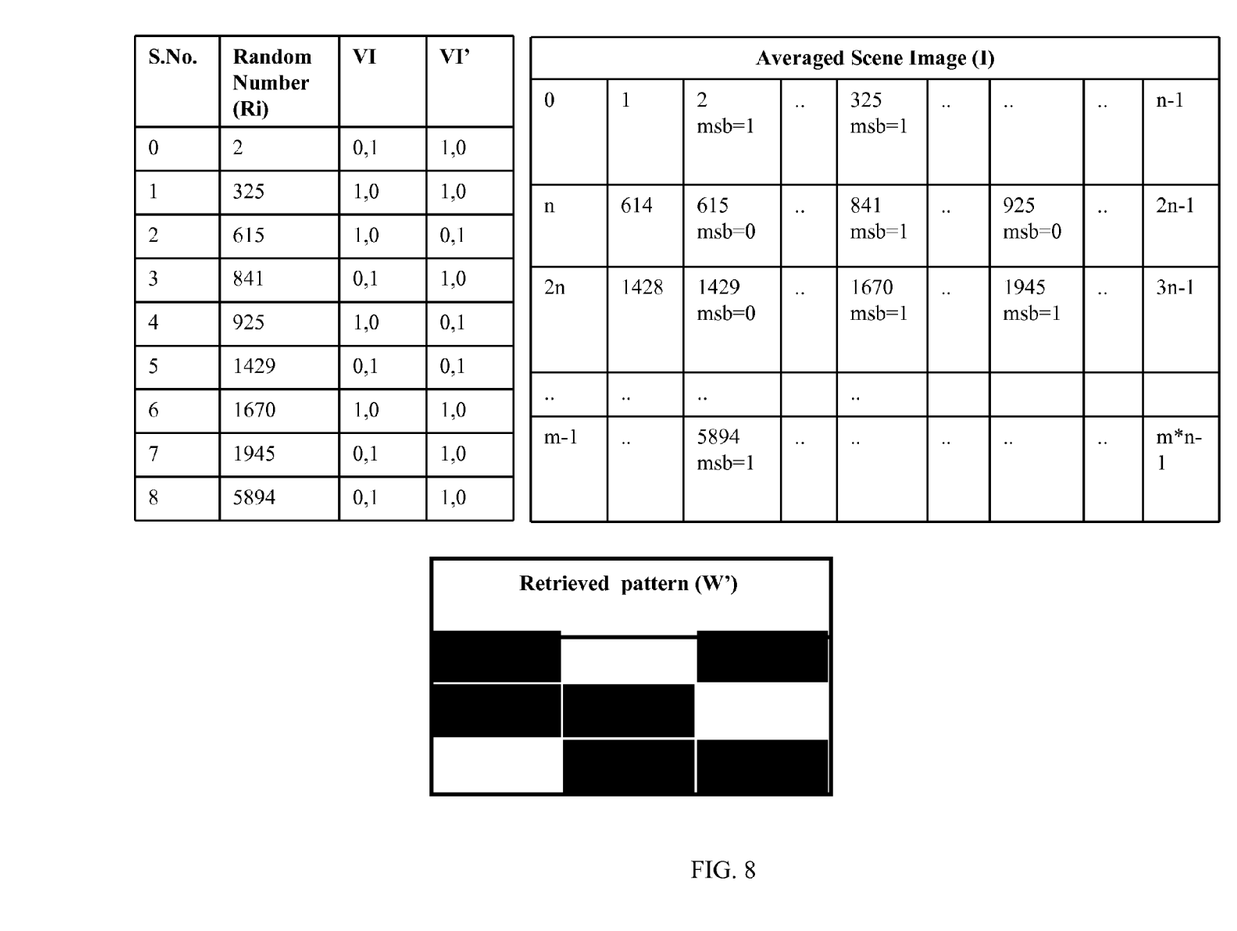
FIG. 8 illustrates tables that represent data employed for retrieving watermark pattern, in accordance with an embodiment of the present invention.

At step 608, a second visual cryptographic share for each of the averaged scene image of the video content is obtained using secret key. In an embodiment of the present invention, the secret key which is generated (as described in FIG. 4) is used as a seed to identify pixels at random locations of the averaged scene image. In an exemplary embodiment of the present invention, h*1 random numbers are generated over the interval (0, m*n) of the averaged scene image (I) using the secret key (S). The random numbers may be denoted as Ri. Referring to FIG. 8, the MSB of each of the Rith pixel of the averaged scene image (I) is obtained and values for verification information VI' (Vi1', Vi2') is assigned using (2,2) visual secret sharing scheme rules for assigning values for VI'. Based on the rules, if MSB is 1, then, (1, 0) is assigned and if MSB is 0, then, (0, 1) is assigned. The VI', which is the second visual cryptographic share, is obtained by assembling all (Vi1',Vi2') pairs. The VI' obtained is (1,0), (1,0), (0,1), (1,0), (0,1), (0,1), (1,0), (1,0), (1,0).

At step 610, first visual cryptographic share of watermark pattern to be overlapped on the second visual cryptographic share of averaged scene image is selected. In an embodiment of the present invention, the first visual cryptographic share which is to be overlapped on the second visual cryptographic share is selected from the set of submitted first visual cryptographic shares by using histogram information and identifying a best histogram match. In an embodiment of the present invention, the color histogram (Hi2) (obtained in step 606) is compared with all the color histogram information (Hi1) that correspond to the set of submitted first visual cryptographic shares. A best matched histogram is found from the set of submitted first visual cryptographic shares using sum of squared differences of the histogram as depicted by the following exemplary equation.

$$\|H_I - H'_I\| = \sum_j^n (H_I[j] - H'_I[j])^2$$

The best matched histogram is computed to ensure that correct combinations of shares are overlapped to retrieve the watermark pattern. In another embodiment of the present invention, in case of monochromatic or grey level video content, characterizing information pertaining to video content may be computed and the first visual cryptographic share may be selected by matching the computed information with information corresponding to the watermark protected video using any known image matching technique.

At step 612, first visual cryptographic share of watermark pattern is decrypted. In an embodiment of the present invention, the selected first visual cryptographic share is decrypted using known decryption technologies.

Figure 7:
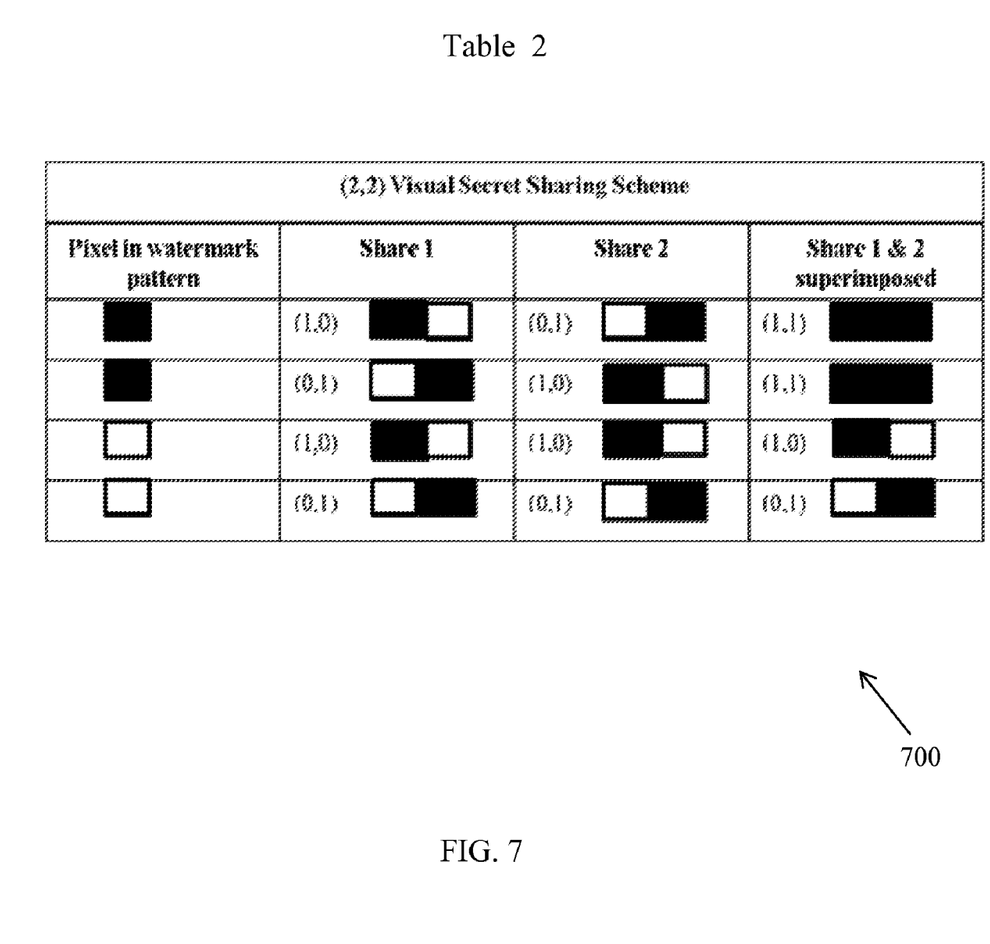
FIG. 7 illustrates a table that depicts overlapping of a first visual cryptographic share with a second visual cryptographic share to retrieve a watermark pattern using (2,2) visual secret sharing, in accordance with an embodiment of the present invention.

At step 614, the first visual cryptographic share of watermark pattern and the second visual cryptographic share are overlapped to retrieve and verify the watermark pattern. In various embodiments of the present invention, the first visual cryptographic share i.e. VI, which is selected and decrypted, is overlapped with the second visual cryptographic share i.e. VI' to retrieve the watermark pattern W'. In an embodiment of the present invention, as illustrated in Table 2 shown in FIG. 7, as per the (2,2) visual secret sharing scheme, if ith pair of VI' (Vi1', Vi2') is equal to the ith pair of VI (Vi1, Vi2), the color of ith pixel of the watermark pattern is assigned white. If ith pair of VI' is not equal to the ith pair of VI, the color of ith pixel of the watermark pattern is assigned black.

Thus, overlapping first visual cryptographic share i.e. VI (0,1), (1,0), (1,0), (0,1), (1,0), (0,1), (1,0), (0,1) and (0, 1) and second visual cryptographic share i.e. VI' (1,0), (1,0), (0,1), (1,0), (0,1), (0,1), (1,0), (1,0), (1,0) provides the retrieved watermark pattern BWBBBWWBB (as shown in FIG. 6).

At step 616, the watermark pattern is verified. In various embodiments of the present invention, the watermark pattern is verified based on similarity between the retrieved watermark pattern and original watermark pattern. In an embodiment of the present invention, the similarity between the original watermark pattern and the retrieved watermark pattern is verified by visual inspection. If the similarity is ascertained, then, it can be inferred that the original watermark pattern is same as the retrieved watermark pattern and the overlapped shares correspond to same secret key and same averaged scene image. As the averaged scene image of the original video is same as the averaged scene image of the suspected video, therefore scene corresponding to those averaged scene images are same for original as well as suspected video. Thus, if similarity is ascertained, copyright infringement of the scene of the original video is confirmed and it is determined that the copyright of the original video is violated. In another embodiment of the present invention, visual inspection is supported by machine inspection by computing the root mean square (RMS) value of pixels of the retrieved watermark pattern and original watermark pattern. The difference between the RMS values of the original watermark pattern and retrieved watermark pattern results in the RMS value of noise. Noise represents the increase in density of the black or white pixel. If the RMS energy of noise is below a predetermined threshold, then, retrieved watermark pattern is similar to the original watermark pattern.

The present invention may be implemented in numerous ways including as an apparatus, method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

We claim:

1. A method for watermarking of video content, wherein the video content comprises one or more scenes, the method comprising:

computing an averaged scene image for each scene of video content, wherein the averaged scene image is computed by performing averaging of frames present in each scene of video content;

generating a set of random numbers for each averaged scene image using a secret key to identify pixels at random locations of the averaged scene image, wherein the secret key is associated with a watermark pattern corresponding to each averaged scene image;

mapping the identified pixels in each averaged scene image to each pixel of corresponding watermark pattern to obtain respective mapped pixels;

fetching and assigning values of verification information using the respective mapped pixels based on predetermined rules; and arranging the values of verification information to obtain a first visual cryptographic share of watermark pattern for each averaged scene image.

2. The method of claim 1 further comprising:
identifying location of a frame in the video content at which a new scene starts, wherein the location of the frame at which new scene starts is identified based on color information in the frames; and
representing location information of the frame in a scene start point information vector to detect change of scene in the video content.

3. The method of claim 2, wherein computing an averaged scene image for each scene of video content by performing averaging of frames present in each scene of video content comprises:
detecting each scene using the scene start point information vector;
identifying color components of each pixel of each frame of each scene; and
computing an average color component value of the identified color components to perform averaging of frames, wherein the average color component values represents the averaged scene image.

4. The method of claim 1, wherein the set of random numbers generated is equal to the number of pixels in the watermark pattern.

5. The method of claim 1, wherein mapping the identified pixels in each averaged scene image to each pixel of corresponding watermark pattern to obtain respective mapped pixels comprises:
obtaining most significant bit of the identified pixels in each averaged scene image; and
mapping the most significant bit of the identified pixels in each averaged scene image to color of each pixel of corresponding watermark pattern.

6. The method of claim 1, wherein the values of verification information and the predetermined rules are based on (k,n) visual secret sharing.

7. The method of claim 1, wherein the first cryptographic share of watermark pattern for each averaged scene image and the secret key are stored.

8. The method of claim 1 further comprising:
computing color histogram information of each averaged scene image; and
storing the computed color histogram information.

9. The method of claim 8 further comprising:
performing digital signing and timestamping of first visual cryptographic share of watermark pattern for each averaged scene image;
encrypting the time stamped and digitally signed first visual cryptographic share of watermark pattern for each averaged scene image;
mapping each of the encrypted first visual cryptographic share of watermark pattern with color histogram information of corresponding averaged scene image; and
storing the mapped information.

10. A method for verifying watermark pattern of a video content to confirm copyright ownership of a watermark protected video content, the method comprising:
receiving at least a set of first visual cryptographic share of watermark pattern of the watermark protected video content and a secret key;
computing an averaged scene image for each scene of the video content, wherein the averaged scene image is computed by performing averaging of frames present in each scene of the video content;
generating a set of random numbers for each averaged scene image using the secret key to identify pixels at random locations of each averaged scene image;
fetching and assigning values of verification information using the identified pixels based on predetermined rules; and
arranging the values of verification information to obtain a second visual cryptographic share of each averaged scene image;
retrieving the watermark pattern corresponding to each averaged scene image of the video content by overlapping the second visual cryptographic share corresponding to each averaged scene image on corresponding first visual cryptographic share of watermark pattern of the watermark protected video content, wherein the first visual cryptographic share of watermark pattern is selected for each averaged scene image from the set of first visual cryptographic share of watermark pattern; and
verifying the retrieved watermark pattern of each averaged scene image to ascertain if the retrieved watermark is same as the original watermark pattern.

11. The method of claim 10 further comprising:
identifying location of a frame in the video content at which a new scene starts, wherein the location of the frame at which new scene starts is identified based on color information in the frames; and
representing location information of the frame in a scene start point information vector to detect change of scene in the video content.

12. The method of claim 10, wherein fetching and assigning values of verification information using the identified pixels based on predetermined rules comprises:
obtaining most significant bit values of the identified pixels; and
fetching and assigning values of verification information using most significant bit values obtained from the identified pixels based on predetermined rules, wherein the values of verification information and predetermined rules are based on (k,n) visual secret sharing.

13. The method of claim 10 further comprising:
computing color histogram information of each averaged scene image.

14. The method of claim 13, wherein retrieving the watermark pattern corresponding to each averaged scene image of the video content by overlapping the second visual cryptographic share on corresponding first visual cryptographic share of watermark pattern comprises:
receiving a set of color histogram information associated with first visual cryptographic share of watermark pattern for each averaged scene image of the watermark protected video content;
comparing the color histogram information of each averaged scene image of the video content with color histogram information associated with first visual cryptographic share of watermark pattern for each averaged scene image of the watermark protected video content;
identifying a best matched color histogram based on the color histogram comparison;
selecting a first visual cryptographic share of watermark pattern associated with a color histogram information that corresponds to the best matched color histogram; and
decrypting the selected first visual cryptographic share of watermark pattern to overlap the first visual cryptographic share of watermark pattern on the second visual cryptographic share.

15. The method of claim 14 further comprising:
performing verification of digital signature of the first visual cryptographic share of watermark pattern for each averaged scene image of the watermark protected video content.

16. A system for watermarking of video content, wherein the video content comprises one or more scenes, the system comprising:
a scene averaging module configured to compute averaged scene image of each scene of the video content;
a watermarking module configured to:
receive each averaged scene image;
generate a set of random numbers for each averaged scene image using a secret key to identify pixels at random locations of the averaged scene image, wherein the secret key is associated with a watermark pattern corresponding to each averaged scene image; and
generate verification information for each averaged scene image by mapping the identified pixels of the averaged scene image to each pixel of corresponding watermark pattern, wherein the verification information represents a first visual cryptographic share of watermark pattern for each averaged scene image.

17. The system of claim 16, wherein the watermarking module is configured to:
fetch and assign values of verification information using the mapped pixels based on predetermined rules, wherein the values of verification information predetermined rules are based on (k,n) visual secret sharing; and
arrange the values of verification information to obtain the first visual cryptographic share of watermark pattern.

18. The system of claim 16 further comprising a scene detection module configured to detect change of scene in the video content by identifying location of a frame in the video content at which a new scene starts.

19. The system of claim 16, wherein the watermarking module is configured to:
perform digital signing and timestamping of first visual cryptographic share for each averaged scene image of the watermark protected video content;
encrypt the time stamped and digitally signed first visual cryptographic share of watermark pattern for each averaged scene image;
map each of the encrypted first visual cryptographic share of watermark pattern with computed color histogram information of corresponding averaged scene image; and
store the mapped information.

20. A system for verifying watermark pattern of a video content to confirm copyright ownership of the watermark protected video content, the system comprising:
a scene averaging module configured to compute averaged scene image of each scene of the video content;
a watermark verification module configured to:
receive at least a set of first visual cryptographic share of watermark pattern of the watermark protected video content and a secret key;
receive each averaged scene image computed in the scene averaging module;
generate a set of random numbers for each averaged scene image using the secret key to identify pixels at random locations of the averaged scene image;
generate a verification information for each averaged scene image using the identified pixels, wherein the verification information represents a second visual cryptographic share of each averaged scene image;
select a first visual cryptographic share of watermark pattern of the watermark protected video content from the received set of first visual cryptographic share of watermark pattern; and
retrieve the watermark pattern for each averaged scene image of the video content by overlapping the selected first visual cryptographic share of watermark pattern on the second visual cryptographic share corresponding to each averaged scene image to verify if the retrieved watermark pattern is same as the original watermark pattern.

21. The system of claim 20 further comprising:
a scene change detection module configured to identify the frames at which a new scene starts on the basis of color information contained in the scene.

22. The system of claim 20, wherein the watermark verification module is configured to:
fetch and assign values of verification information using the identified pixels on the basis of predetermined rules, wherein the values of verification information and predetermined rules are based on (k,n) visual secret sharing; and
arrange the values of verification information to obtain the second visual cryptographic share of the averaged scene image.

23. The system of claim 20, wherein the watermark verification module is further configured to:
receive a set of color histogram information associated with first visual cryptographic share of watermark pattern for each averaged scene image of the watermark protected video content;
compute color histogram information of each averaged scene image of the video content;
compare color histogram information of each averaged scene image of the video content with color histogram information associated with first visual cryptographic share of watermark pattern for each averaged scene image of watermark protected video content,
identify a best matched color histogram based on the color histogram comparison; and
select a first visual cryptographic share of watermark pattern of the watermark protected video content that correspond to the best matched color histogram for each averaged scene image from the received set of first visual cryptographic share of watermark pattern.

24. The system of claim 23, wherein the watermark verification module is further configured to:
perform verification of digital signature of the first visual cryptographic share of watermark pattern for each averaged scene image of the watermark protected video content; and
decrypt the selected first visual cryptographic share of watermark pattern to overlap the first visual cryptographic share of watermark pattern on the second visual cryptographic share.

25. A computer program product comprising a non-transitory computer-readable medium having a computer-readable program code embodied therein for watermarking of video content, wherein the video content comprises one or more scenes, the computer program product comprising:
program instruction means for computing an averaged scene image for each scene of video content, wherein the averaged scene image is computed by performing averaging of frames present in each scene of video content;
program instruction means for generating a set of random numbers for each averaged scene image using a secret key to identify pixels at random locations of the averaged scene image, wherein the secret key is associated with a watermark pattern corresponding to each averaged scene image;

program instruction means for mapping the identified pixels in each averaged scene image to each pixel of corresponding watermark pattern to obtain respective mapped pixels;

program instruction means for fetching and assigning values of verification information using the respective mapped pixels based on predetermined rules; and program instruction means for arranging the values of verification information to obtain a first visual cryptographic share of watermark pattern for each averaged scene image.

26. A computer program product comprising a non-transitory computer-readable medium having a computer-readable program code embodied therein for verifying watermark pattern of a video content to confirm copyright ownership of a watermark protected video content, the computer program product comprising:

program instruction means for receiving at least a set of first visual cryptographic share of watermark pattern of the watermark protected video content and a secret key;

program instruction means for computing an averaged scene image for each scene of the video content, wherein the averaged scene image is computed by performing averaging of frames present in each scene of the video content;

program instruction means for generating a set of random numbers for each averaged scene image using the secret key to identify pixels at random locations of each averaged scene image;

program instruction means for fetching and assigning values of verification information using the identified pixels based on predetermined rules;

program instruction means for arranging the values of verification information to obtain a second visual cryptographic share of each averaged scene image;

program instruction means for retrieving the watermark pattern corresponding to each averaged scene image of the video content by overlapping the second visual cryptographic share corresponding to each averaged scene image on corresponding first visual cryptographic share of watermark pattern of the watermark protected video content, wherein the first visual cryptographic share of watermark pattern is selected for each averaged scene image from the set of first visual cryptographic share of watermark pattern; and program instruction means for verifying the retrieved watermark pattern of each averaged scene image to ascertain if the retrieved watermark is same as the original watermark pattern.

* * * * *